(12) United States Patent
Ghosh et al.

(10) Patent No.: US 10,331,177 B2
(45) Date of Patent: Jun. 25, 2019

(54) HINGE FOR AN ELECTRONIC DEVICE

(71) Applicants: Intel Corporation, Santa Clara, CA (US); Prosenjit Ghosh, Portland, OR (US); Denica N. Larsen, Portland, OR (US); James M. Okuley, Portland, OR (US); Hong W. Wong, Portland, OR (US)

(72) Inventors: Prosenjit Ghosh, Portland, OR (US); Denica N. Larsen, Portland, OR (US); James M. Okuley, Portland, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/754,444

(22) PCT Filed: Sep. 25, 2015

(86) PCT No.: PCT/US2015/052234
§ 371 (c)(1),
(2) Date: Feb. 22, 2018

(87) PCT Pub. No.: WO2017/052590
PCT Pub. Date: Mar. 30, 2017

(65) Prior Publication Data
US 2018/0246546 A1 Aug. 30, 2018

(51) Int. Cl.
*H05K 5/00* (2006.01)
*G06F 1/16* (2006.01)
(Continued)

(52) U.S. Cl.
CPC ............. *G06F 1/1683* (2013.01); *E05D 3/06* (2013.01); *E05D 11/0081* (2013.01); *G06F 1/16* (2013.01);
(Continued)

(58) Field of Classification Search
CPC ....................................................... H05K 5/00
See application file for complete search history.

(56) References Cited

U.S. PATENT DOCUMENTS

| 1,512,489 A | 10/1924 | John |
| 1,788,974 A | 1/1931 | Paul |

(Continued)

FOREIGN PATENT DOCUMENTS

| CN | 302558085 S | 9/2013 |
| CN | 304578206 | 4/2018 |

(Continued)

OTHER PUBLICATIONS

International Search Report and Written Opinion in International Patent Application No. PCT/US2015/052234 dated Jul. 11, 2016, 13 pages.

(Continued)

*Primary Examiner* — Jerry Wu
(74) *Attorney, Agent, or Firm* — Patent Capital Group

(57) ABSTRACT

Particular embodiments described herein provide for device that includes a first housing that includes a first module, a second housing that includes a second module, and a hinge that rotatable couples the first housing to the second housing. The hinge can include a first axle, a second axle, and a plurality of hinge links. At least one of the hinge links includes an interconnect to provide a communication path between the first module and the second module.

20 Claims, 9 Drawing Sheets

(51) Int. Cl.

| | | |
|---|---|---|
| *G06F 13/00* | (2006.01) | |
| *G06F 9/46* | (2006.01) | |
| *E05D 3/06* | (2006.01) | |
| *E05D 11/00* | (2006.01) | |
| *H01R 35/02* | (2006.01) | |
| *E05D 5/10* | (2006.01) | |
| *E05D 11/08* | (2006.01) | |

(52) U.S. Cl.
CPC .......... *G06F 1/1615* (2013.01); *G06F 1/1618* (2013.01); *G06F 1/1643* (2013.01); *G06F 1/1647* (2013.01); *G06F 1/1681* (2013.01); *G06F 9/46* (2013.01); *G06F 13/00* (2013.01); *H01R 35/02* (2013.01); *E05D 5/10* (2013.01); *E05D 11/08* (2013.01); *E05D 2005/102* (2013.01); *E05Y 2800/102* (2013.01); *E05Y 2900/606* (2013.01)

(56) References Cited

U.S. PATENT DOCUMENTS

| | | | |
|---|---|---|---|
| 1,792,996 | A | 2/1931 | Mason |
| 2,123,625 | A | 7/1938 | Emmer |
| D135,640 | S | 5/1943 | Coppola |
| 2,489,706 | A | 11/1949 | Edward |
| 2,511,153 | A | 6/1950 | Edward |
| 3,003,503 | A | 10/1961 | Dennis |
| 3,045,573 | A | 7/1962 | Bertil |
| 3,077,888 | A | 2/1963 | Thieme |
| 3,956,798 | A | 5/1976 | Wright |
| 4,441,834 | A | 4/1984 | Cardellini |
| 4,825,395 | A * | 4/1989 | Kinser, Jr. ............ H01H 13/702 16/366 |
| D378,686 | S | 4/1997 | Proctor et al. |
| 5,729,781 | A | 3/1998 | Warren |
| 5,861,893 | A | 1/1999 | Sturgess |
| D418,160 | S | 12/1999 | Gunasekera |
| D435,550 | S | 12/2000 | Chu et al. |
| D478,076 | S | 8/2003 | Hong |
| D497,947 | S | 11/2004 | Kaneda |
| 6,864,911 | B1 | 3/2005 | Zhang et al. |
| D523,078 | S | 6/2006 | Ong |
| D584,726 | S | 1/2009 | Morita |
| 7,522,944 | B2 | 4/2009 | Hyun et al. |
| D603,398 | S | 11/2009 | Watson et al. |
| D629,779 | S | 12/2010 | Ahn et al. |
| D631,043 | S | 1/2011 | Kell |
| D638,833 | S | 5/2011 | Chuang |
| D640,686 | S | 6/2011 | Daniel |
| D657,457 | S | 4/2012 | Gehrke et al. |
| 8,229,510 | B2 | 7/2012 | Lin et al. |
| D680,529 | S | 4/2013 | Reeves et al. |
| 8,633,989 | B2 | 1/2014 | Okuda |
| 8,638,357 | B2 | 1/2014 | Tomizawa et al. |
| D703,201 | S | 4/2014 | Tian |
| 8,971,031 | B2 | 3/2015 | Mok et al. |
| 9,013,458 | B2 | 4/2015 | Cho et al. |
| D729,792 | S | 5/2015 | Kurimoto et al. |
| D746,285 | S | 12/2015 | Okabe |
| 9,243,432 | B2 | 1/2016 | Lee |
| 9,317,067 | B2 | 4/2016 | Choi et al. |
| 9,460,330 | B2 | 10/2016 | Lee et al. |
| D770,446 | S | 11/2016 | Cho et al. |
| D772,835 | S | 11/2016 | Kim et al. |
| D773,452 | S | 12/2016 | Cheah et al. |
| D778,865 | S | 2/2017 | Kim et al. |
| D778,866 | S | 2/2017 | Lee |
| D797,729 | S | 9/2017 | Park et al. |
| D798,257 | S | 9/2017 | Choo et al. |
| D798,304 | S | 9/2017 | Sung et al. |
| 9,801,290 | B2 | 10/2017 | Ahn |
| D802,583 | S | 11/2017 | Oakley et al. |
| 9,823,093 | B2 | 11/2017 | Kauhaniemi et al. |
| D808,949 | S | 1/2018 | Zuniga et al. |
| D811,393 | S | 2/2018 | Ahn et al. |
| D813,859 | S | 3/2018 | Oakley |
| 9,930,794 | B2 | 3/2018 | Luan et al. |
| 9,947,883 | B2 | 4/2018 | Choi et al. |
| 9,954,986 | B2 | 4/2018 | Shin et al. |
| 9,983,627 | B1 | 5/2018 | Pelissier et al. |
| 9,985,236 | B2 | 5/2018 | Kim et al. |
| D822,658 | S | 7/2018 | Okuley et al. |
| 10,024,090 | B2 | 7/2018 | Tazbaz et al. |
| D826,889 | S | 8/2018 | Seo et al. |
| D828,319 | S | 9/2018 | Seo et al. |
| 2002/0183099 | A1 | 12/2002 | Lee |
| 2004/0141064 | A1 | 7/2004 | Ezawa |
| 2005/0239520 | A1 | 10/2005 | Stefansen |
| 2006/0238968 | A1 | 10/2006 | Maatta et al. |
| 2007/0057866 | A1 | 3/2007 | Lee et al. |
| 2007/0107163 | A1 | 5/2007 | Barnett |
| 2007/0147827 | A1 | 6/2007 | Sheynman et al. |
| 2007/0296809 | A1 | 12/2007 | Newbery |
| 2008/0157922 | A1 | 7/2008 | Thompson et al. |
| 2008/0170806 | A1 | 7/2008 | Kim |
| 2009/0148149 | A1 | 6/2009 | Chishima |
| 2010/0194860 | A1 | 8/2010 | Mentz et al. |
| 2010/0227650 | A1 | 9/2010 | Kim et al. |
| 2010/0232100 | A1 | 9/2010 | Fukuma et al. |
| 2011/0063791 | A1 | 3/2011 | Wu et al. |
| 2011/0228052 | A1 | 9/2011 | Ohnishi et al. |
| 2011/0249042 | A1 | 10/2011 | Yamamoto et al. |
| 2012/0113614 | A1 | 5/2012 | Watanabe |
| 2013/0044240 | A1 | 2/2013 | Leskela et al. |
| 2013/0088447 | A1 | 4/2013 | Becze |
| 2013/0250492 | A1 | 9/2013 | Wong et al. |
| 2013/0321340 | A1 | 12/2013 | Seo et al. |
| 2014/0101578 | A1 | 4/2014 | Kwak et al. |
| 2014/0185233 | A1 | 7/2014 | MacDonald et al. |
| 2014/0262933 | A1 | 9/2014 | Lockwood |
| 2015/0013107 | A1 | 1/2015 | Shin et al. |
| 2015/0146349 | A1 | 5/2015 | Choi et al. |
| 2015/0186093 | A1 | 7/2015 | Kim et al. |
| 2015/0227174 | A1 | 8/2015 | Byquist et al. |
| 2015/0229913 | A1 | 8/2015 | Bei et al. |
| 2015/0257289 | A1 | 9/2015 | Lee et al. |
| 2015/0338888 | A1 | 11/2015 | Kim et al. |
| 2016/0085271 | A1 | 3/2016 | Morrison et al. |
| 2016/0116944 | A1 | 4/2016 | Lee et al. |
| 2016/0132077 | A1 | 5/2016 | Cheah et al. |
| 2016/0139634 | A1 | 5/2016 | Cho et al. |
| 2016/0147267 | A1 | 5/2016 | Campbell et al. |
| 2016/0195901 | A1 | 7/2016 | Kauhaniemi et al. |
| 2016/0201718 | A1 | 7/2016 | Mak |
| 2016/0378137 | A1 | 12/2016 | Kwong et al. |
| 2017/0058590 | A1 | 3/2017 | Carullo et al. |
| 2017/0061836 | A1 | 3/2017 | Kim et al. |
| 2017/0185104 | A1 | 6/2017 | Krivoy et al. |
| 2017/0254127 | A1 | 9/2017 | Uchiyama et al. |
| 2017/0277228 | A1 | 9/2017 | Wong et al. |
| 2017/0322598 | A1 | 11/2017 | Fujimoto |
| 2017/0364220 | A1 | 12/2017 | Karl et al. |
| 2018/0059740 | A1 | 3/2018 | Kato |
| 2018/0067520 | A1 | 3/2018 | Määttä et al. |
| 2018/0246546 | A1 | 8/2018 | Ghosh et al. |

FOREIGN PATENT DOCUMENTS

| | | |
|---|---|---|
| KR | 1020140046343 | 4/2014 |
| KR | 1020140052570 | 5/2014 |
| TW | 201713102 A | 4/2017 |
| WO | 2016209532 A1 | 12/2016 |
| WO | 2017052590 A1 | 3/2017 |
| WO | D096686001 | 7/2017 |

OTHER PUBLICATIONS

Final Office Action in U.S. Appl. No. 14/751,633 dated May 10, 2017, 23 pages.
Final Office Action in U.S. Appl. No. 14/751,633 dated Nov. 17, 2017, 23 pages.

(56) References Cited

OTHER PUBLICATIONS

International Preliminary Report on Patentability received for International Application No. PCT/US2016/034350, dated Dec. 26, 2017, 11 pages.
International Search Report and Written Opinion received for International Application No. PCT/US2016/034350, dated Sep. 12, 2016, 14 pages.
Non Final Office Action in U.S. Appl. No. 14/751,633 dated Aug. 2, 2017, 24 pages.
Non Final Office Action in U.S. Appl. No. 14/751,633 dated Jan. 27, 2017, 19 pages.
U.S. Appl. No. 14/751,633, filed Jun. 26, 2015, 53 pages.
Design U.S. Appl. No. 29/569,872, filed Jun. 30, 2016, 88 pages.
e-Ink Book and Device Concepts, announced Jan. 26, 2015 [online], [site visited Jun. 22, 2017], Available from Internet, URL:.
Lenovo Yoga Book 2016, announced Nov. 15, 2016, [site visited Oct. 5, 2017], Available from INternet, URL:.
United States Design Patent Application titled, "Computer Notebook", Design U.S. Appl. No. 29/650,403, filed Jun. 6, 2018, 8 pages.
United States Design Patent Application titled, "Computer Notebook", Design U.S. Appl. No. 29/650,405, filed Jun. 6, 2018, 11 pages.
United States Design Patent Application titled, "Computer Notebook", Design U.S. Appl. No. 29/650,408, filed Jun. 6, 2018, 11 pages.
Intel Tiger Rapids Hands-On at Computex 2018, published Jun. 6, 2018 [online], [retrieved Aug. 24, 2018], Available from Internet, URL : https://www.youtube.com/watch?v=d2CgFEOOEgl&feature=youtube at apporximately 0:03.
Joshuah, "Wooden Double Action Hinge", published Feb. 17, 2012 [online], [retrieved Aug. 24, 2018], Available from Internet, URL:http://lumberjocks.com/Joshuah/blog/28271, (Feb. 17, 2012), 11 pgs.
Tiger Rapids, the two screen PCT, published Jun. 4, 2018 [online], [retrieved Aug. 24, 2018]Available from the internet, URL: https://www.pcworld.com/article/3278049/computers/intel-tiger-rapids-dual-screen-pc.html.

\* cited by examiner

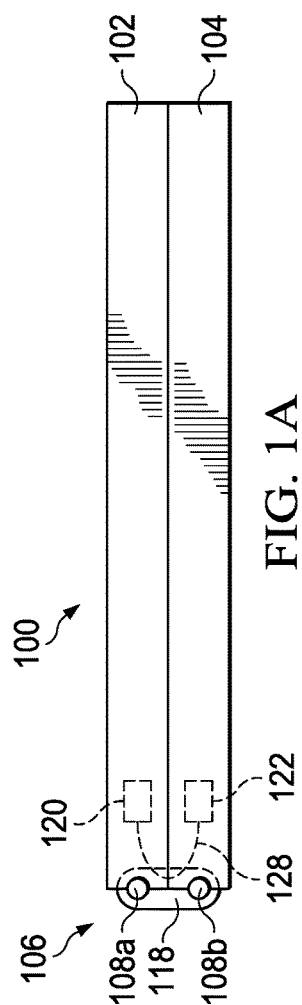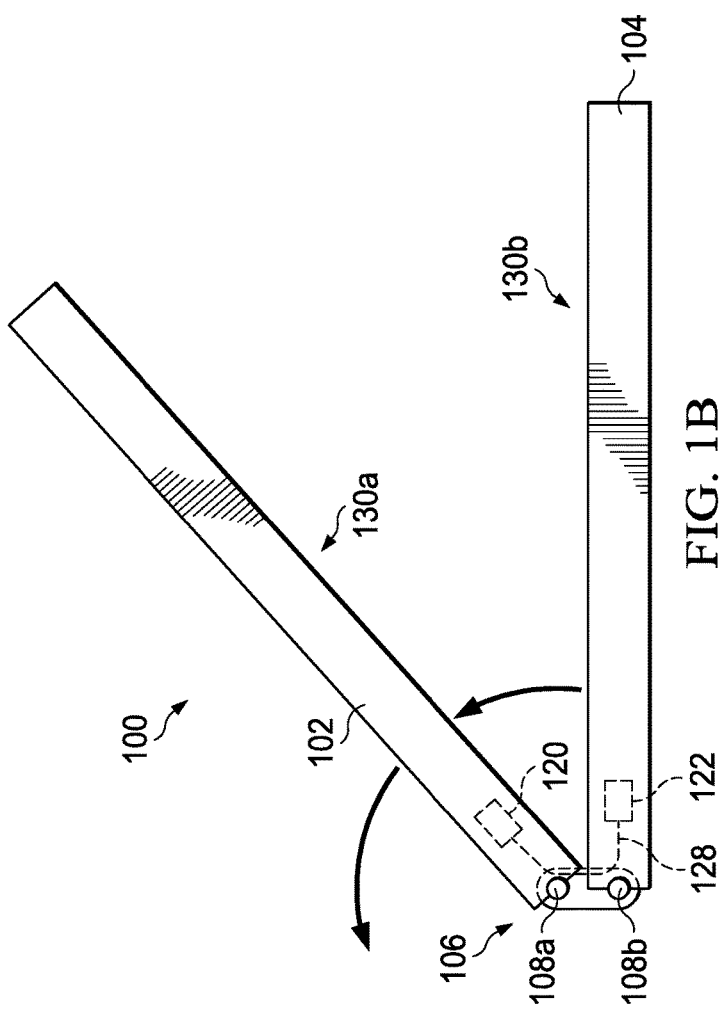

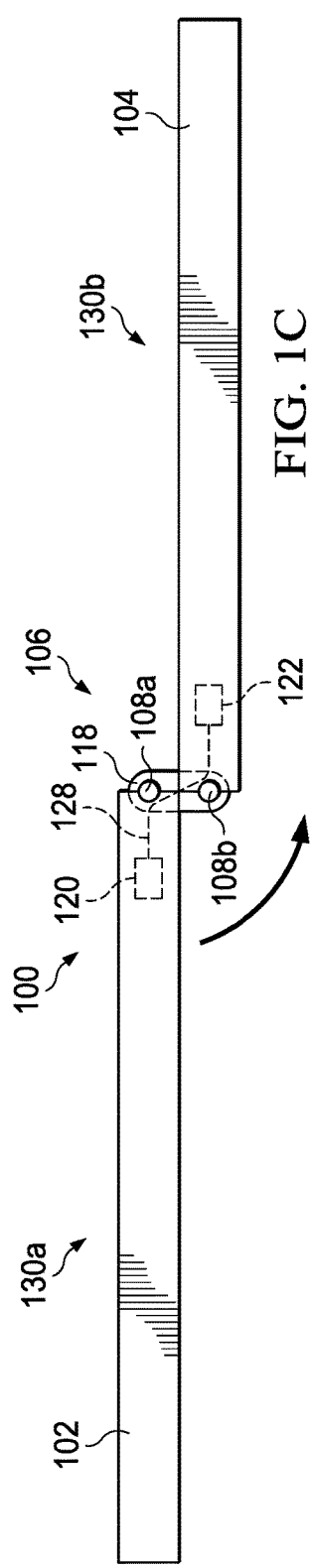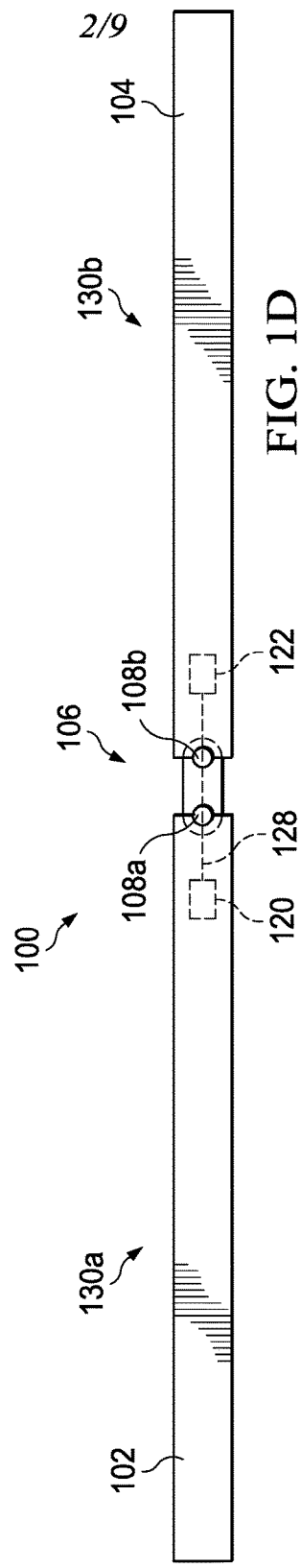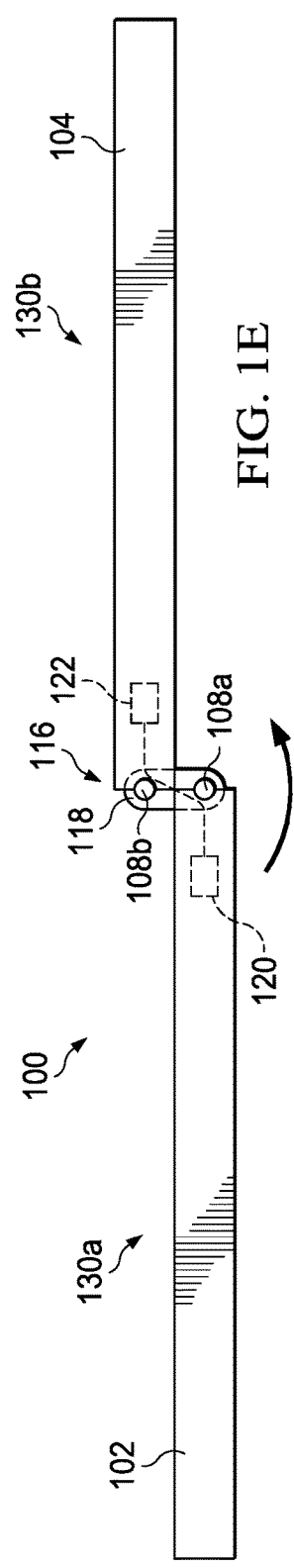

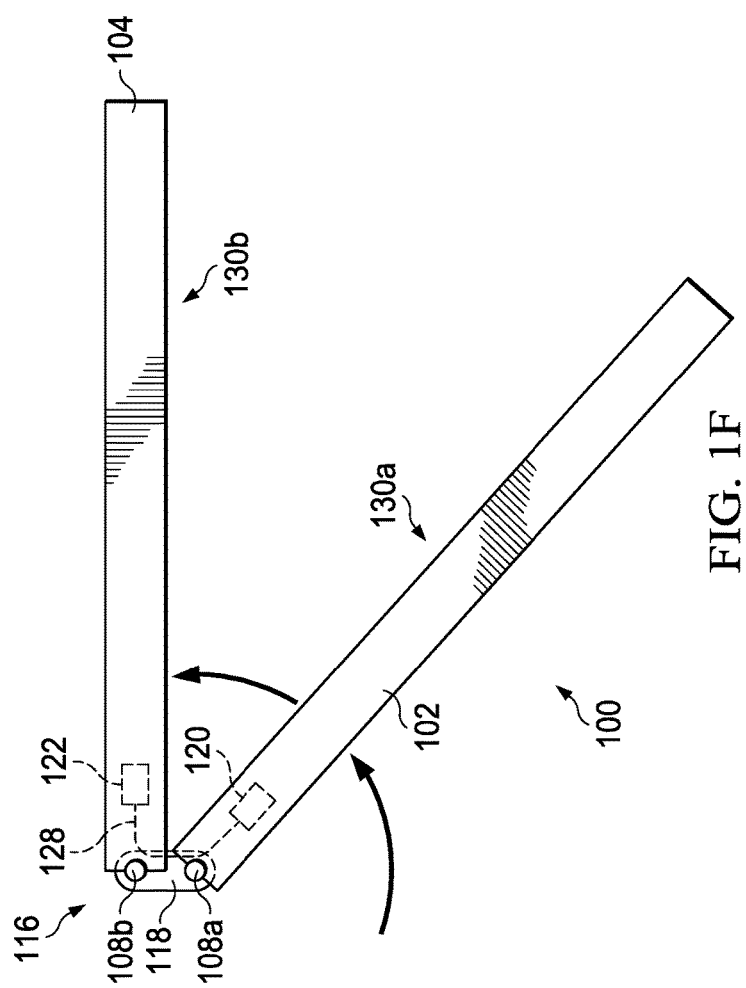
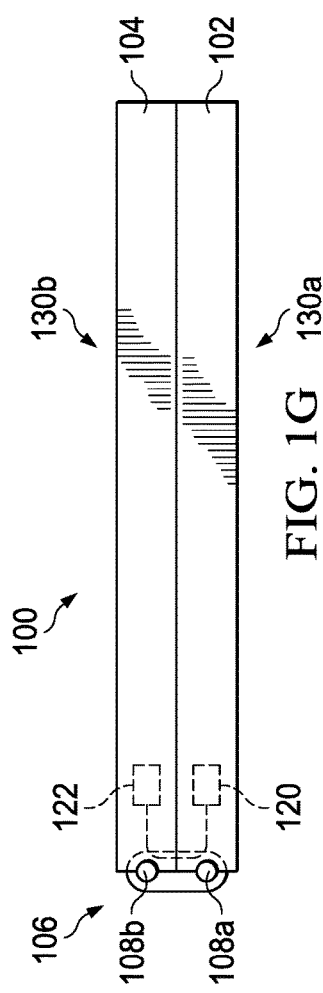

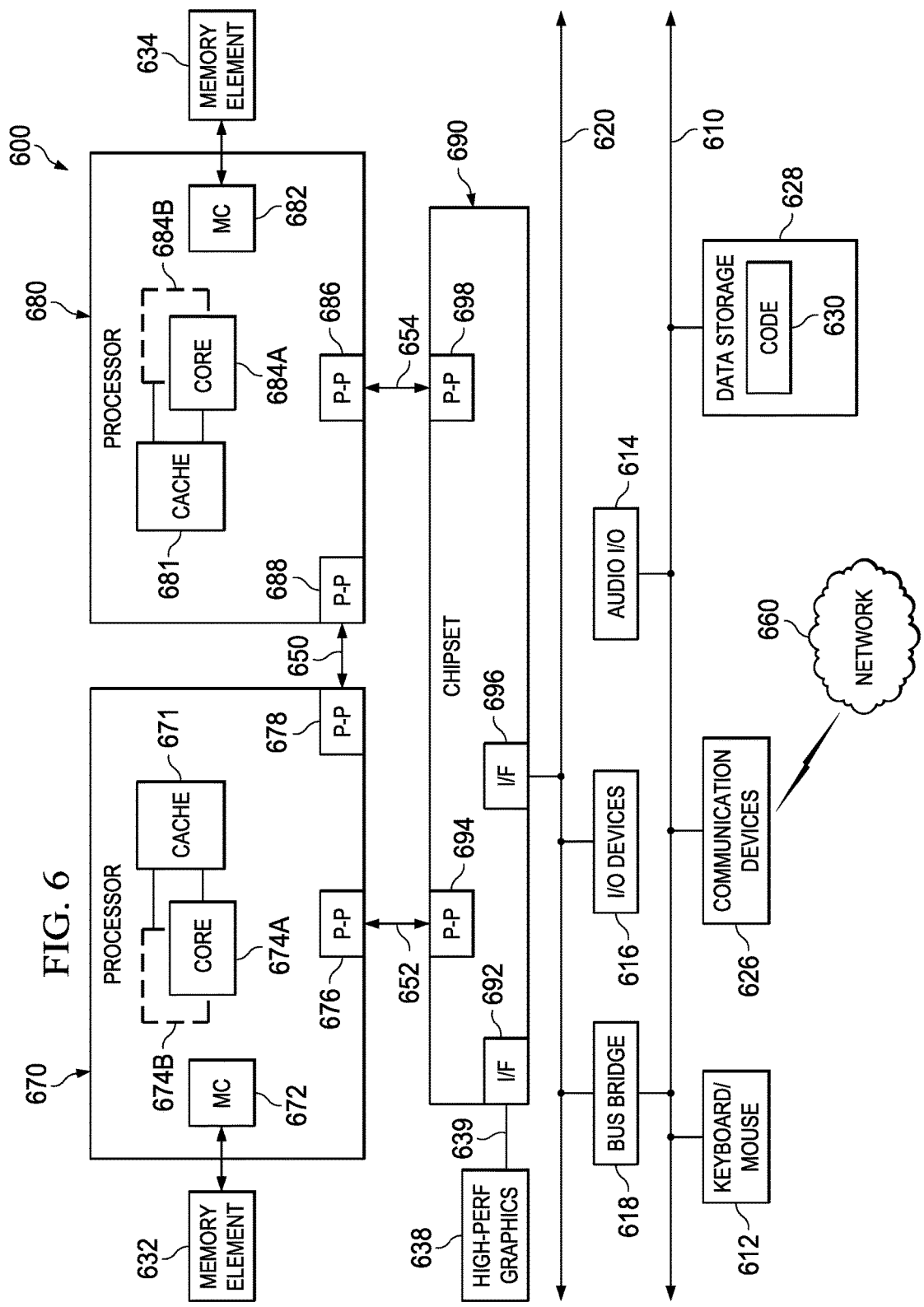

HINGE FOR AN ELECTRONIC DEVICE

CROSS-REFERENCE TO RELATED APPLICATION

This Application is a national stage application under 35 U.S.C. § 371 of PCT Application PCT/US2015/052234, filed Sep. 25, 2015 and entitled "HINGE FOR AN ELECTRONIC DEVICE," which is hereby incorporated by reference in its entirety.

TECHNICAL FIELD

This disclosure relates in general to the field of electronic devices, and more particularly, to a hinge for an electronic device.

BRIEF DESCRIPTION OF THE DRAWINGS

To provide a more complete understanding of the present disclosure and features and advantages thereof, reference is made to the following description, taken in conjunction with the accompanying FIGURES, embodiments are illustrated by way of example and not by way of limitation in the FIGURES of the accompanying drawings, in which like references indicate similar elements and in which:

FIG. 1A is a simplified schematic diagram illustrating a side view of an embodiment of an electronic device, in accordance with one embodiment of the present disclosure;

FIG. 1B is a simplified schematic diagram illustrating a side view of an embodiment of an electronic device, in accordance with one embodiment of the present disclosure;

FIG. 1C is a simplified schematic diagram illustrating a side view of an embodiment of an electronic device, in accordance with one embodiment of the present disclosure;

FIG. 1D is a simplified schematic diagram illustrating a side view of an embodiment of an electronic device, in accordance with one embodiment of the present disclosure;

FIG. 1E is a simplified schematic diagram illustrating a side view of an embodiment of an electronic device, in accordance with one embodiment of the present disclosure;

FIG. 1F is a simplified schematic diagram illustrating a side view of an embodiment of an electronic device, in accordance with one embodiment of the present disclosure;

FIG. 1G is a simplified schematic diagram illustrating a side view of an embodiment of an electronic device, in accordance with one embodiment of the present disclosure;

FIG. 6 is a block diagram illustrating an example computing system that is arranged in a point-to-point configuration in accordance with an embodiment;

Figure 2:
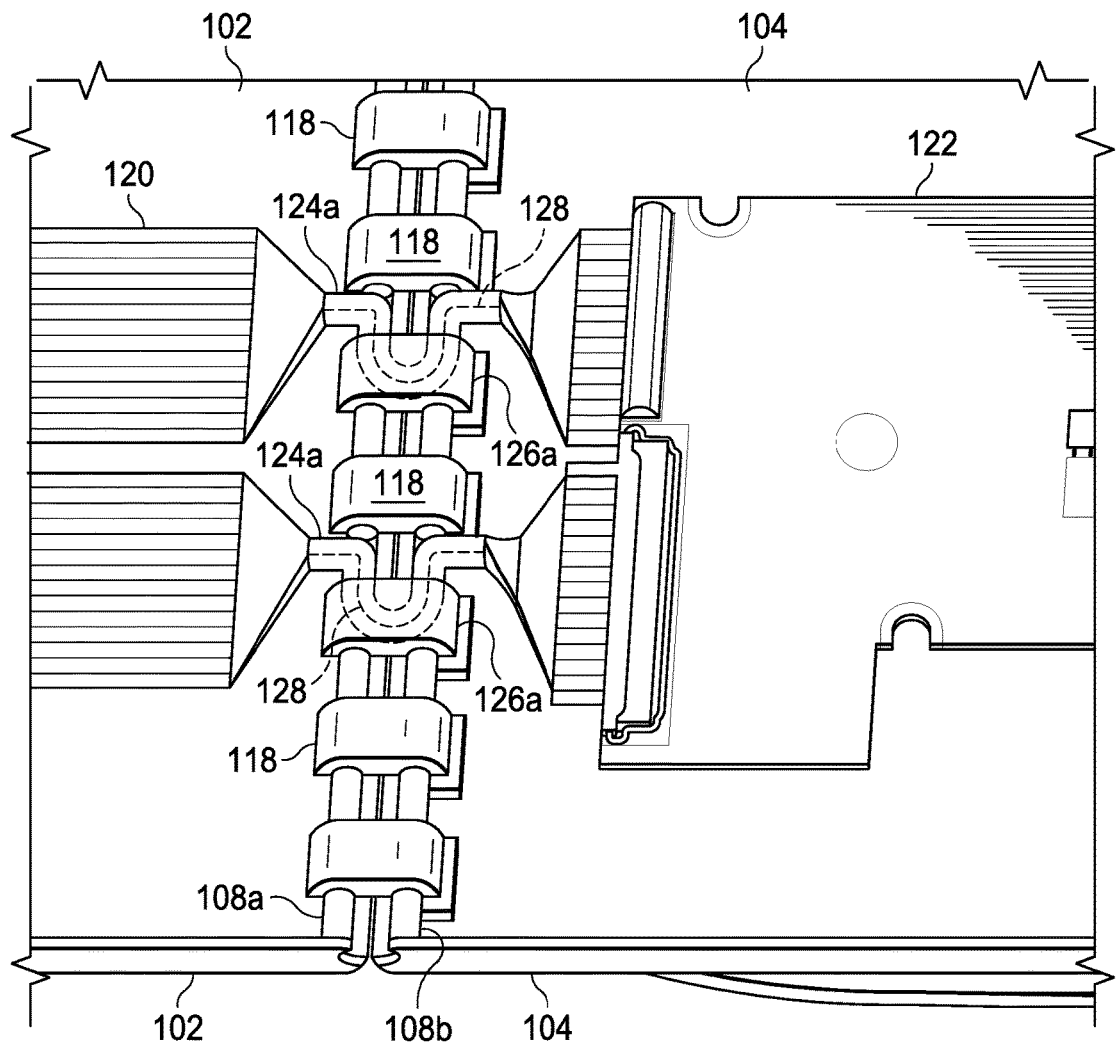
FIG. 2 is a simplified block diagram view of an embodiment of a portion of a hinge, in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

FIG. 1A is a simplified side view illustrating an embodiment of an electronic device 100 is a closed clamshell configuration, in accordance with one embodiment of the present disclosure. Electronic device 100 can include a first housing 102, a second housing 104, and a hinge 106. First housing 102 can include a first module 120. Second housing 104 can include a second module 122. First module 120 and second module 122 can be electrically coupled using interconnect 128.

Hinge 106 can be configured to rotatably couple first housing 102 and second housing 104 and allow for three hundred and sixty degree (360°) or about 360° rotation of first housing 102 relative to second housing 104. Hinge 106 can include a first axle 108a, a second axle 108b, and hinge link 118. When first housing 102 is rotated relative to second housing 104, hinge 106 can be configured to allow interconnect 128 to pass signals, data, power, etc. between first housing 102 and second housing 104.

Turning to FIG. 1B, FIG. 1B is a simplified side view illustrating an embodiment of an electronic device 100 is an open clamshell configuration, in accordance with one embodiment of the present disclosure. First housing 102 can include a first display 130a. Second housing 104 can include a second display 130b. First display 130a and second display 130b can each be a touchscreen display. As illustrated in FIG. 1B, first housing 102 has been titled or rotated away from second housing 104 using hinge 106. More specifically, relative to second housing 104, first housing 102 has been rotated about first axle 108a.

Turning to FIG. 1C, FIG. 1C is a simplified side view illustrating an embodiment of an electronic device 100 is an open near flat configuration, in accordance with one embodiment of the present disclosure. As illustrated in FIG. 1C, first housing 102 has been titled or rotated away from second housing 104 using hinge 106. More specifically, relative to second housing 104, first housing 102 has been rotated about first axle 108a such that first housing 102 is about parallel with second housing 104.

Turning to FIG. 1D, FIG. 1D is a simplified side view illustrating an embodiment of an electronic device 100 is an open near flat clamshell configuration, in accordance with one embodiment of the present disclosure. As illustrated in FIG. 1D, first housing 102 has been titled or rotated away from second housing 104 using hinge 106. More specifically, relative to second housing 104, first housing 102 has been rotated about second axle 108b such that first housing 102 is about parallel and on the same plane with second housing 104.

Turning to FIG. 1E, FIG. 1E is a simplified side view illustrating an embodiment of an electronic device 100 is an open near flat configuration, in accordance with one embodiment of the present disclosure. As illustrated in FIG. 1E, first housing 102 has been titled or rotated towards second housing 104 using hinge 106. More specifically, relative to second housing 104, first housing 102 has been rotated about second axle 108b such that first housing 102 is about parallel with second housing 104.

Turning to FIG. 1F, FIG. 1F is a simplified side view illustrating an embodiment of an electronic device 100 is an open clamshell configuration, in accordance with one embodiment of the present disclosure. As illustrated in FIG. 1F, first housing 102 has been titled or rotated towards second housing 104 using hinge 106. More specifically, relative to second housing 104, first housing 102 has been rotated about second axle 108b.

Turning to FIG. 1G, FIG. 1G is a simplified side view illustrating an embodiment of an electronic device 100 is an open clamshell configuration, in accordance with one embodiment of the present disclosure. As illustrated in FIG. 1G, first housing 102 has been titled or rotated towards second housing 104 using hinge 106. More specifically, relative to second housing 104, first housing 102 has been rotated about second axle 108b such that electronic device is in a tablet configuration.

For purposes of illustrating certain example features of electronic device 100, the following foundational information may be viewed as a basis from which the present disclosure may be properly explained. As laptops and other hinged electronic devices continue to evolve, traditional clamshell laptops have become thinner with the trend towards extremely thin form factors. Currently, form-factor limitations for electronic devices are addressed by enabling ultra-low-profile and small form-factor components (e.g., coreless package and motherboard, connectors, batteries, etc.). The development of high density super-capacitors is also being used to further reduce the battery form-factor and density to enable low-profile platforms. However, the form factor for a low-profile device is often limited by the hinge. In addition to the low profile, some devices are touch based designs that include a touch display. This causes further problems with the hinge design because to pass communication between the two housing separated by the hinge, sufficient space must be left to account for an interconnect or means of communicating between the two housings. What is needed is a hinge design that can allow for a thin or ultra-thin form factor but still allow for communication between the housings connected by the hinge. It would be beneficial if the hinge could allow for 360° or about 360° rotation.

An electronic device design and hinge as outlined in FIGS. 1A-1G, can resolve these issues (and others). Hinge 106 can be configured to allow or enable electronic device to include a touch display (e.g., first display 130a and second display 130b) in both housings such that writing or notetaking can be a design usage of electronic device 102. For example, hinge mechanism can be configured to enable first housing 102 and second housing 104 to lay flat on the tablet or counter top (e.g., as illustrated in FIG. 1D) to enhance the use of first display 130a and second display 130b or a writing experience during use of electronic device 100. In an example, hinge 106 can have an overall diameter of about 10 millimeters (mms) and allow a plurality of electrical connections (e.g., a plurality of coax wires) to run between first housing 102 and second housing 104. In a specific example, hinge 106 can have an overall diameter of about 6 mms and allow at least 50 electrical connections (e.g., at least 100 coax wires) to run between first housing 102 and second housing 104. In another specific example, hinge 106 can have an overall diameter of about 5 mms and allow at least 50 electrical connections (e.g., at least 100 coax wires) to run between first housing 102 and second housing 104. In yet another specific example, hinge 106 can have an overall diameter of about 4 mms and allow at least 50 electrical connections (e.g., at least 100 coax wires) to run between first housing 102 and second housing 104.

Using hinge 106, electronic device 102 can be configured to include a dual screen digital notebook profile where hinge 106 allows each side of the digital notebook (e.g., first housing 102 and second housing 104) to rotate like a paper notebook. Each side of the device has its own rotating axle (e.g., first axle 108a and second axle 108b) with built-in frictional elements to allow the electronic device 100 to be opened and rotated such that the electronic device 100 can lay flat or relatively flat and both first housing 102 and second housing 104 can be flat and parallel on the same plane. Additional, hinge 106 can allow electronic device 100 to be rotated at a 360° or about a 360° such that electronic device 102 can be used in a laptop configuration (both open and closed), a tablet configuration, or other intermediary configurations.

Turning to FIG. 2, FIG. 2 is a simplified block diagram view of an embodiment of an electronic device, in accordance with one embodiment of the present disclosure. Hinge 106 can include hinge links 118, first axle 108a, second axle 108b, one or more interconnect pathways 124a, and interconnect hinge 126a. First housing 102 can be rotatably coupled to second housing using links 118 in hinge 106. First axle 108a and second axle 108b can allow for 360° or about 360° rotation of first housing 102 relative to second housing 104.

In an example, one or more of hinge links 118 in hinge 106 can be replaced with interconnect hinge 126a. Interconnect hinge 126a can include interconnect pathway 124a. Interconnect pathway 124a can include interconnect 128 and allow for communication and an electrical connection between first module 120 and second module 122 while still allowing for 360° or about 360° rotation of first housing 102 relative to second housing 104.

Some current hinges that have the 360° angle rotation typically use a dual-axis with built in frictional element and timing gears such as spur gears. However, the frictional elements and timing gears cause the entire hinge to be relatively thick and bulky. Hinge 106 can be configured to include first axle 108a and second axle 108b that each include a torsional element built into the axle to provide the frictional or positional control features without causing the hinge to be relatively thick or bulky.

Figure 3:
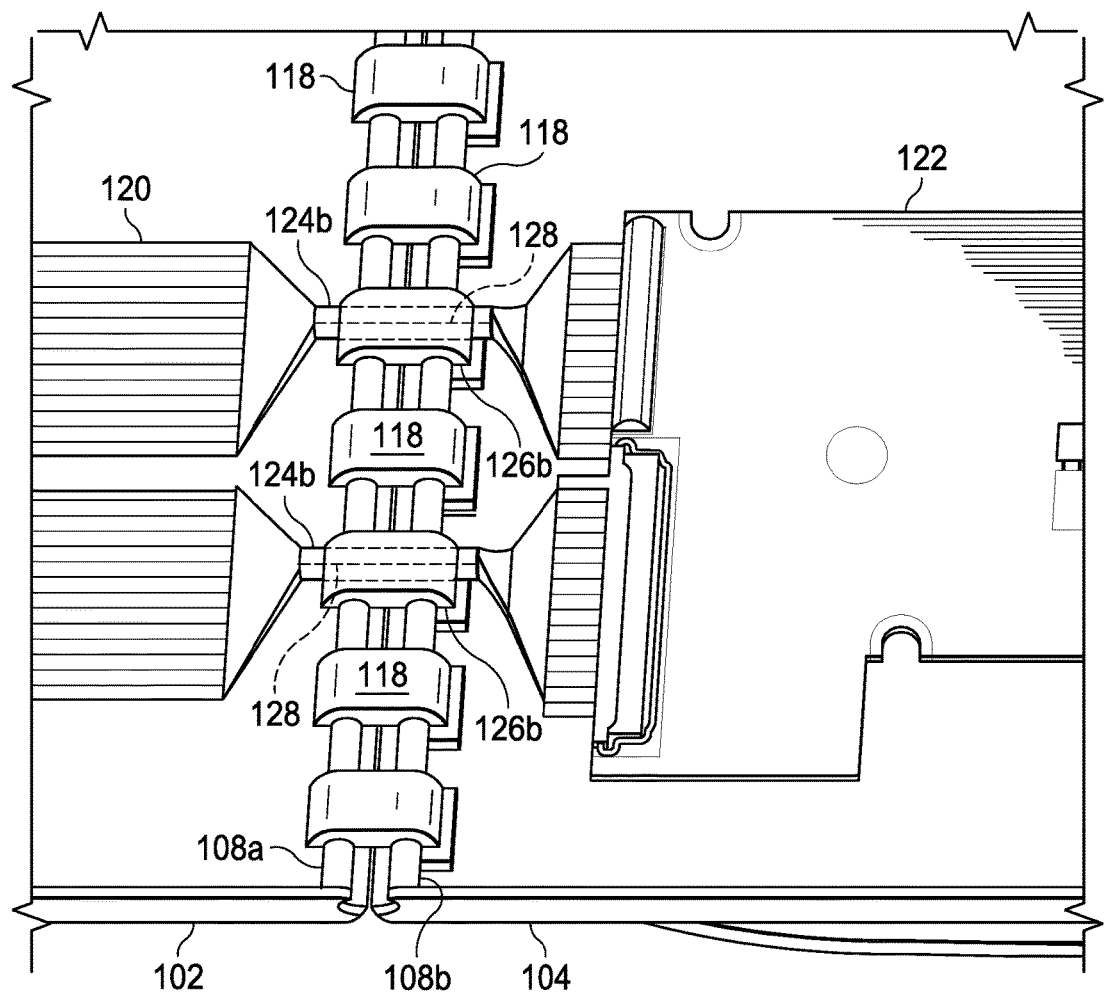
FIG. 3 is a simplified block diagram view of an embodiment of a portion of a hinge, in accordance with one embodiment of the present disclosure.

Turning to FIG. 3, FIG. 3 is a simplified block diagram view of an embodiment of an electronic device, in accordance with one embodiment of the present disclosure. In an example, one or more of hinge links 118 in hinge 106 can be replaced with interconnect hinge 126b. Interconnect hinge 126b can include interconnect pathway 124b. Interconnect pathway 124b can include interconnect 128 and allow for communication and an electrical connection between first module 120 and second module 122 while still allowing for 360° or about 360° rotation of first housing 102 relative to second housing 104.

Figures 4, 5:
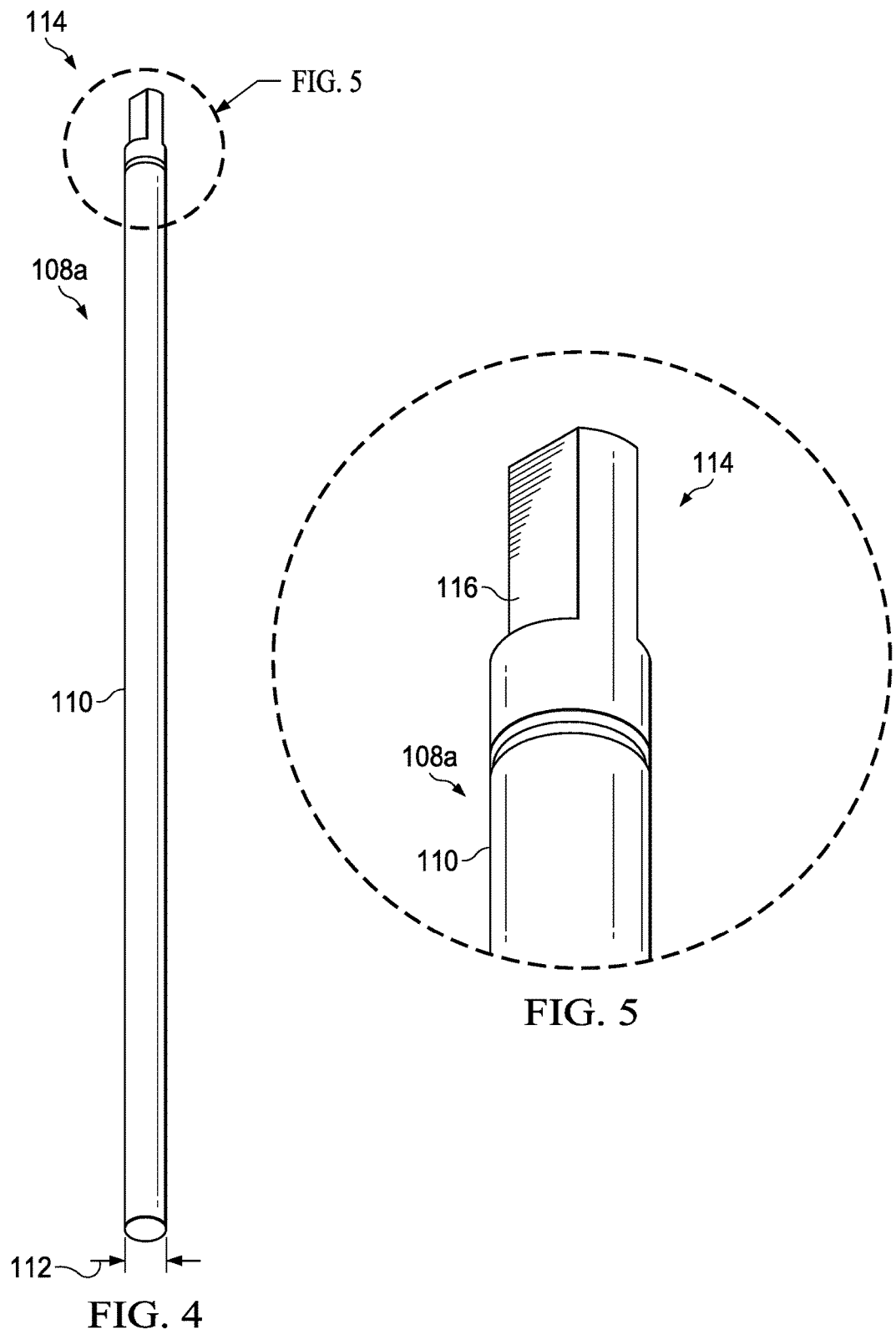
FIG. 4 is a simplified block diagram view of an embodiment of a portion of a hinge, in accordance with one embodiment of the present disclosure.
FIG. 5 is a simplified block diagram view of a portion of an embodiment of a hinge, in accordance with one embodiment of the present disclosure.

Turning to FIG. 4, FIG. 4 is a simplified block diagram view of a portion of an embodiment of a hinge, in accordance with one embodiment of the present disclosure. As illustrated in FIG. 4, first axle 108a (and second axle 108b not shown) can include a main body 110 and a rotational end 114. Rotation end 114 can be included on each end of first axle 108a. Main body 110 can have a thickness or diameter between about 3-6 mms to allow for a thin, ultra-thin profile, or ultra-low profile of electronic device 100.

Turning to FIG. 5, FIG. 5 is a simplified block diagram view of a portion of an embodiment of a hinge, in accordance with one embodiment of the present disclosure. First axle 108a can include main body 110 and rotation end 114. Rotation end 114 can include pivot member 116. In an example, main body 110 can remain relatively static while pivot member 116 can rotate relative to main body 110.

As illustrated in FIGS. 1A-1D, using first axle 108a, first housing 102 can rotate about one-hundred and eighty degrees (180°) relative to second housing through the rotation of pivot member 116. As illustrated in FIGS. 1D-1G, using second axle 108b, first housing 102 can rotate about one-hundred and eighty degrees (180°) relative to second housing through the rotation of pivot member 116. First axle 108a and second axle 108b can allow for 360° or about 360° rotation of first housing 102 relative to second housing 104. Interconnect hinge 126a (and 126b) can allow for an electrical connection between first module 120 and second module 122 while still allowing for 360° or about 360° rotation of first housing 102 relative to second housing 104.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication systems 100a and 100b may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
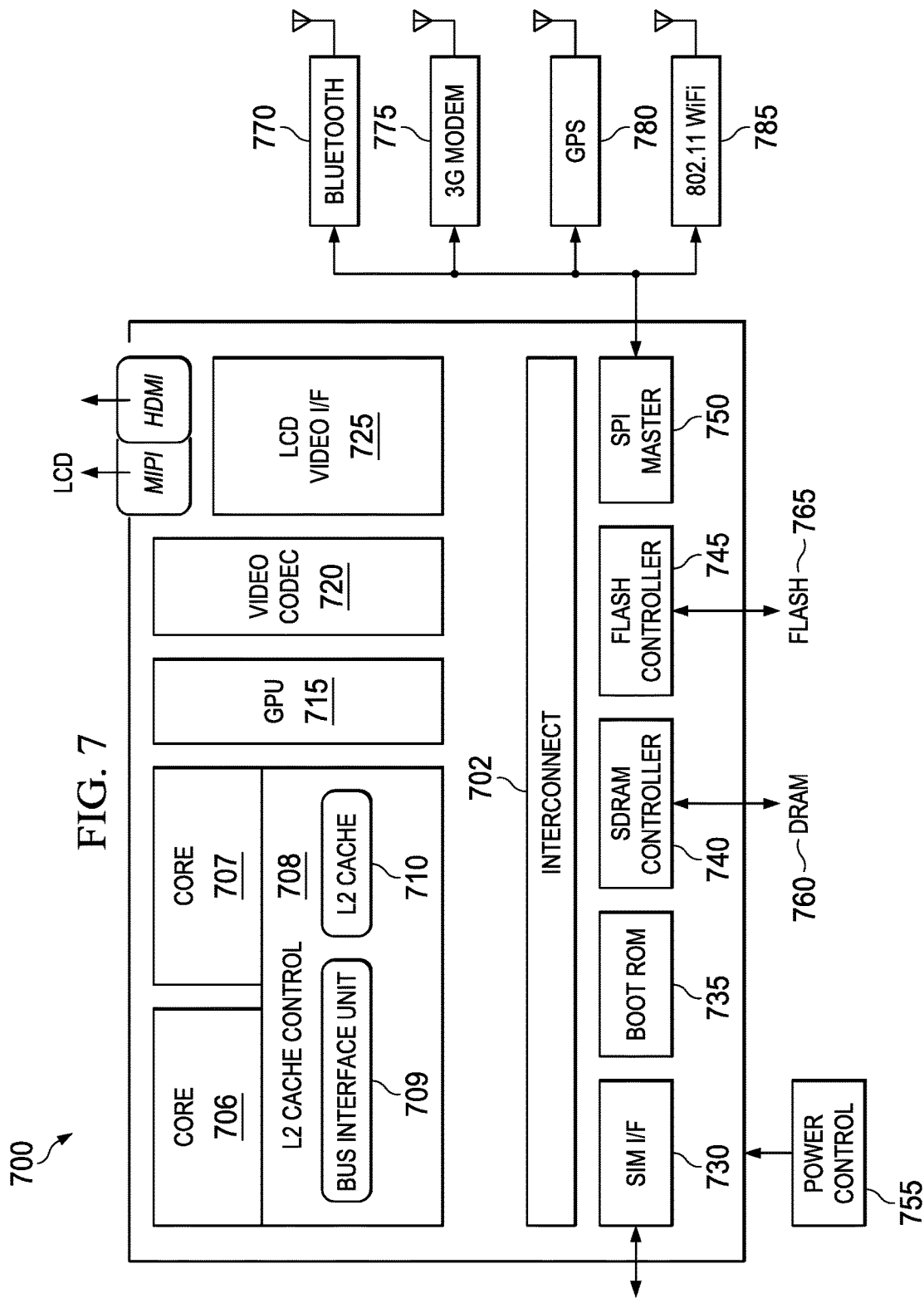
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the virtualized trusted storage features discussed herein and an ARM component. For example, the example of FIG. 7 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
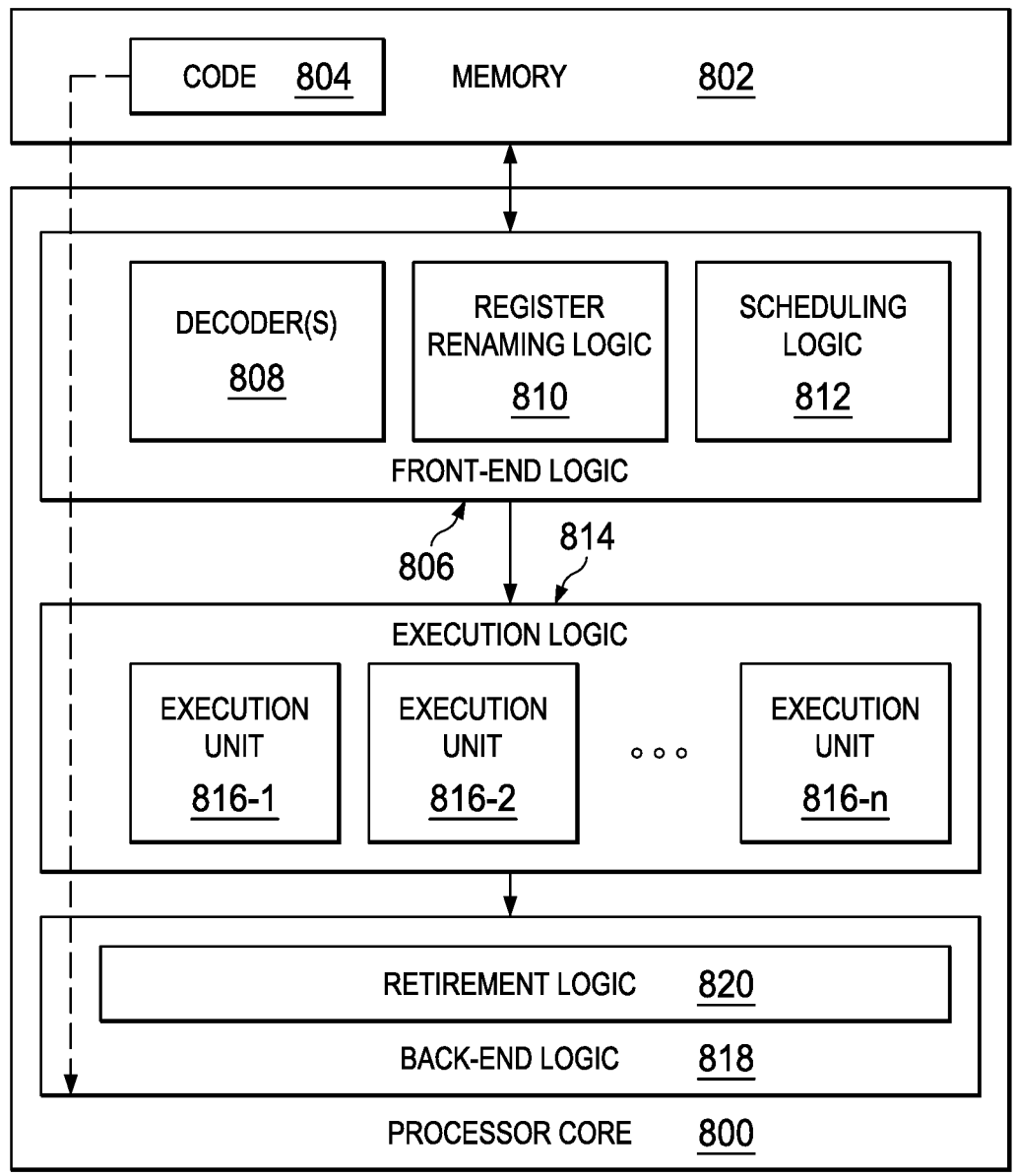
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674*a*, 674*b*, 684*a*, and 684*b* shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that electronic device 140 and its teachings are readily scalable and can accommodate a large number of components, as well as more complicated/sophisticated arrangements and configurations. Accordingly, the examples provided should not limit the scope or inhibit the broad teachings of electronic device 100 as potentially applied to a myriad of other architectures.

It is also important to note that the operations in the diagrams illustrate only some of the possible correlating scenarios and patterns that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 100 has been illustrated with reference to particular elements and operations that facilitate the communication process, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 172 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is a device that includes a first housing that includes a first module, a second housing that includes a second module, and a hinge that rotatable couples the first housing to the second housing. The hinge can include a first axle, a second axle, and a plurality of hinge links. At least one of the hinge links includes an interconnect to provide a communication path between the first module and the second module.

In Example A2, the subject matter of Example A1 may optionally include where the first housing includes a first touchscreen and the second housing includes a second touchscreen.

In Example A3, the subject matter of any of the preceding 'A' Examples can optionally include where both the first housing and the second housing can be flat and parallel on the same plane.

In Example A4, the subject matter of any of the preceding 'A' Examples can optionally include where the first housing can rotate about three hundred and sixty degrees relative to the second housing.

In Example A5, the subject matter of any of the preceding 'A' Examples can optionally include where the overall thickness of the device is about six millimeters or less.

In Example A6, the subject matter of any of the preceding 'A' Examples can optionally include where the interconnect can include one hundred electrical connections or more.

In Example A7, the subject matter of any of the preceding 'A' Examples can optionally include where the first axle and the second axle each include a rotation end to facilitate rotation of first housing relative to second housing, wherein the rotation end includes a friction element.

Example M1 is a method that includes rotating a first housing of a device relative to a second housing of the device using a hinge. The first housing can include a first module, the second housing can include a second module, and the hinge rotatable couples the first housing to the second housing. The hinge can include a first axle, a second axle, and a plurality of hinge links. At least one of the hinge links includes an interconnect to provide a communication path between the first module and the second module.

In Example M2, the subject matter of any of the preceding 'M' Examples can optionally include where the first housing includes a first touchscreen and the second housing includes a second touchscreen.

In Example M3, the subject matter of any of the preceding 'M' Examples can optionally include where both the first housing and the second housing can be flat and parallel on the same plane.

In Example M4, the subject matter of any of the preceding 'M' Examples can optionally include where the first housing can rotate about three hundred and sixty degrees relative to the second housing.

In Example M5, the subject matter of any of the preceding 'M' Examples can optionally include where overall thickness of the device is about six millimeters or less.

In Example M6, the subject matter of any of the preceding 'M' Examples can optionally include where the interconnect can include one hundred electrical connections or more.

In Example M7, the subject matter of any of the preceding 'M' Examples can optionally include where the first axle and the second axle each include a rotation end to facilitate rotation of first housing relative to second housing, wherein the rotation end includes a friction element.

An example system S1 can include an ultra-low profile electronic device. The ultra-low profile electronic device can include a first housing that includes a first module, a second housing that includes a second module, and a hinge that rotatable couples the first housing to the second housing. The hinge can include a first axle, a second axle, and a plurality of hinge links, where at least one of the hinge links includes an interconnect to provide a communication path between the first module and the second module.

An example system S2 can include where the first housing includes a first touchscreen and the second housing includes a second touchscreen.

In Example S3, the subject matter of any of the preceding 'SS' Examples can optionally include where both the first housing and the second housing can be flat and parallel on the same plane.

In Example S4, the subject matter of any of the preceding 'SS' Examples can optionally include where the first housing can rotate about three hundred and sixty degrees relative to the second housing.

In Example S5, the subject matter of any of the preceding 'SS' Examples can optionally include where the overall thickness of the device is about six millimeters or less.

In Example S6, the subject matter of any of the preceding 'S' Examples can optionally include where the interconnect can include one hundred electrical connections or more.

In Example S7, the subject matter of any of the preceding 'S' Examples can optionally include where the first axle and the second axle each include a rotation end to facilitate rotation of first housing relative to second housing, wherein the rotation end includes a friction element.

Example X1 is a machine-readable storage medium including machine-readable instructions to implement a method or realize an apparatus as in any one of the Examples A1-A7, and M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A device, comprising:
    a first housing that includes a first module;
    a second housing that includes a second module, wherein when the first housing is over the second housing, the first housing and the second housing have a total thickness between about three millimeters to about six millimeters; and
    a hinge that rotatable couples the first housing to the second housing, wherein the hinge includes: a first axle and a second axle extended along a at least a majority of the length edge of the first and second housings respectively; and a plurality of hinge links wherein each hinge link is physically separate from another hinge link and engages with the first and second axles through side walls, wherein at least one hinge link from the plurality of hinge links includes an interconnect routed from one of the side walls of the at least one hinge link and through a center of the at least one hinge link to provide an electronic communication path between the first module and the second module, wherein an overall thickness of the plurality of hinge links is less than about five millimeters.

2. The device of claim 1, wherein the first housing includes a first touchscreen and the second housing includes a second touchscreen.

3. The device of claim 2, wherein both the first housing and the second housing can be flat and parallel on a same plane.

4. The device of claim 3, wherein the first housing can rotate about three hundred and sixty degrees relative to the second housing.

5. The device of claim 1, wherein an overall thickness of the plurality of hinge links is about four millimeters.

6. The device of claim 5, wherein the interconnect can include one hundred electrical connections or more.

7. The device of claim 1, wherein the first axle and the second axle each include a rotation end to facilitate rotation of first housing relative to second housing, wherein the rotation end includes a friction element.

8. A method, comprising: rotating a first housing of a device relative to a second housing of the device using a hinge, wherein: the first housing that includes a first module, wherein the first housing has a total first housing thickness between about three millimeters to about six millimeters; the second housing that includes a second module, wherein the second housing has a total second housing thickness between about three millimeters to about six millimeters; and the hinge rotatable couples the first housing to the second housing, wherein the hinge includes: a first axle and a second axle extended along at least a majority of a length edge of the first and second housings respectively; and a plurality of hinge links wherein each hinge link is physically separate from another hinge link and engages with the first and second axles through side walls, wherein at least one of the hinge link links includes an interconnect routed from one of the side walls and through a center of the at least one hinge link to provide an electronic communication patch between the first module and the second module, wherein an overall thickness of the plurality of hinge links is less than about six millimeters.

9. The method of claim 8, wherein the first housing includes a first touchscreen and the second housing includes a second touchscreen.

10. The method of claim 9, wherein both the first housing and the second housing can be flat and parallel on a same plane.

11. The method of claim 8, wherein the first housing can rotate about three hundred and sixty degrees relative to the second housing.

12. The method of claim 8, wherein an overall thickness of the device is about six millimeters and an overall hinge thickness of the plurality of hinge links is about four millimeters to about six millimeters.

13. The method of claim 12, wherein the interconnect can include one hundred electrical connections or more.

14. The method of claim 8, wherein the first axle and the second axle each include a rotation end to facilitate rotation of first housing relative to second housing, wherein the rotation end includes a friction element.

15. An ultra-low profile electronic device, comprising: a first housing that includes a first module; a second housing that includes a second module, wherein when the first housing is over the second housing, the first housing and the second housing have a total thinness between about three millimeters to about six millimeters; and a hinge that rotatable couples the first housing to the second housing, wherein an overall thickness of the electronic device is about six millimeters or less, and wherein the hinge includes: a first axle and a second axle extended along at least a majority of a length edge of the first and second housings respectively; and a plurality of hinge links wherein each hinge link is physically separate from another hinge link and engages with the first and second axles through side walls, wherein at least one of the hinge link links includes an interconnect routed from one of the side walls and through a center of the at least one hinge link to provide an electronic communication patch between the first module and the second module, wherein an overall thickness of the plurality of hinge links is less than about five millimeters.

16. The electronic device of claim 15, wherein the first housing includes a first touchscreen and the second housing includes a second touchscreen.

17. The electronic device of claim 16, wherein both the first housing and the second housing can be flat and parallel on a same plane.

18. The electronic device of claim 15, wherein the first housing can rotate about three hundred and sixty degrees relative to the second housing.

19. The electronic device of claim 15, wherein an overall thickness of the plurality of hinge links is about four millimeters.

20. The electronic device of claim 19, wherein the interconnect can include one hundred electrical connections or more.

* * * * *

UNITED STATES PATENT AND TRADEMARK OFFICE
CERTIFICATE OF CORRECTION

PATENT NO. : 10,331,177 B2
APPLICATION NO. : 15/754444
DATED : June 25, 2019
INVENTOR(S) : Prosenjit Ghosh et al.

Page 1 of 1

It is certified that error appears in the above-identified patent and that said Letters Patent is hereby corrected as shown below:

In the Claims

In Column 11, Lines 6-7, in Claim 8, after "one", delete "of the", therefor.

In Column 11, Line 7, in Claim 8, after "link", delete "links", therefor.

In Column 12, Line 13, in Claim 15, after "one", delete "of the", therefor.

In Column 12, Line 13, in Claim 15, after "link", delete "links", therefor.

Signed and Sealed this
Tenth Day of September, 2019

Andrei Iancu
*Director of the United States Patent and Trademark Office*